United States Patent Office 3,501,759
Patented Mar. 17, 1970

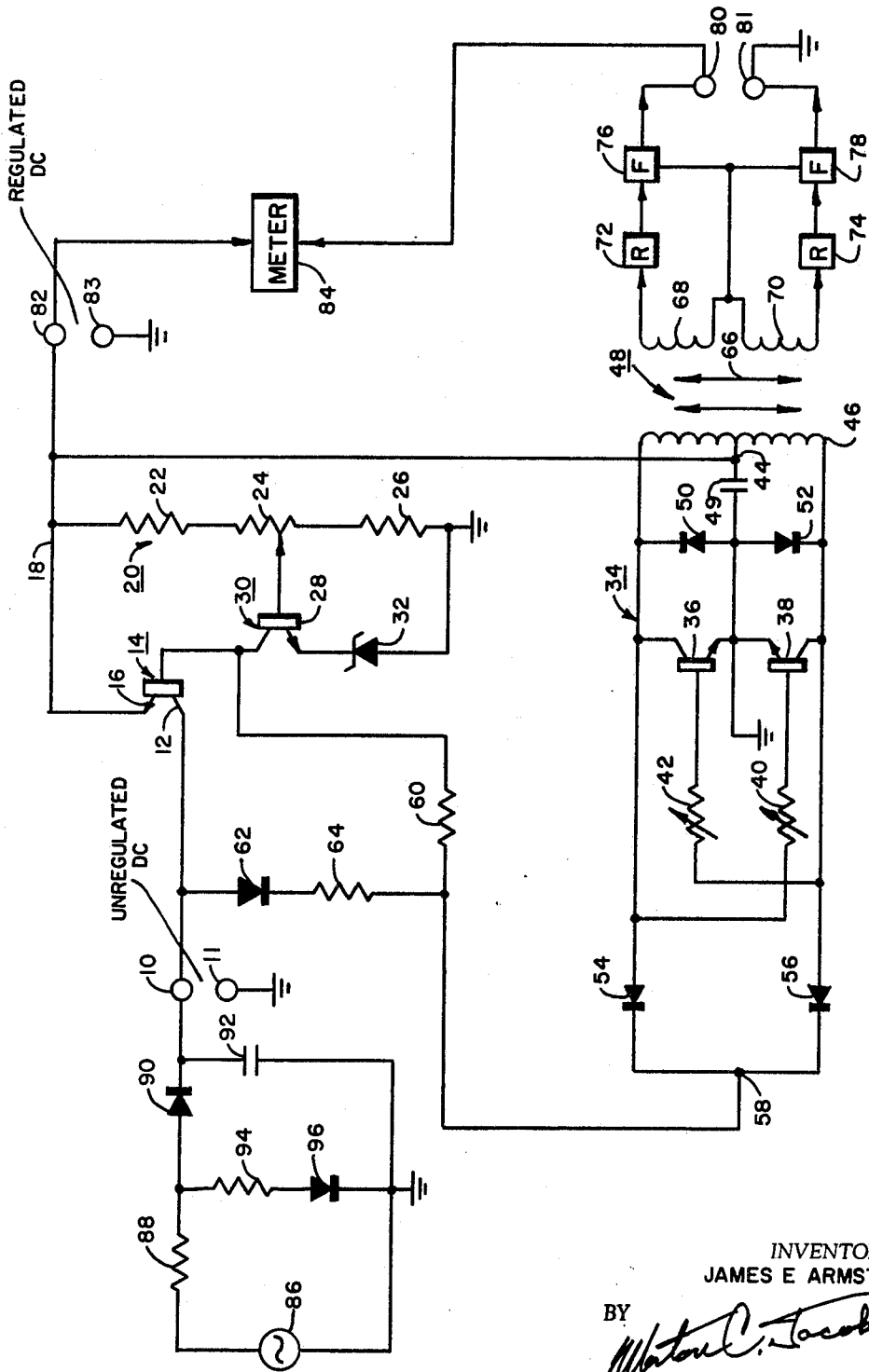

3,501,759
REGULATED POWER SUPPLY
James E. Armstrong, Maple Glen, Pa., assignor to Robinson-Halpern Company, a corporation of Pennsylvania
Filed May 20, 1966, Ser. No. 559,029
Int. Cl. H03b 3/00
U.S. Cl. 340—199                    7 Claims This invention relates to regulated power supplies, and more particularly to a system for regulation of direct-current and alternating-current power.

In one application of the invention a regulated alternating-current (A-C) power supply is used for operating a measuring system in which a pressure transducer operates a linear variable differential transformer; one example of such a transducer and differential transformer is set forth in U.S. Patent 3,044,029. In such a measuring system, the transformer is powered by an alternating-current source and the reliability and accuracy of the measurements depend upon the regulation of the A-C voltage. It has also been found that this invention has application for the regulation of direct-current (D-C) power supplies.

It is among the objects of this invention to provide a new and improved regulated power supply.

Another object is to provide a new and improved regulated alternating-current power supply.

Another object is to provide a new and improved regulated supply of alternating current for a transformer.

Another object is to provide a new and improved regulated direct-current power supply.

In accordance with an embodiment of this invention, a regulated A-C supply for operating a differential transformer is provided together with a regulated D-C supply that is used for a reference voltage. An oscillator converts the regulated direct voltage to the alternating voltage. The regulated D-C voltage is developed on a line by way of an input amplifier that receives an unregulated direct voltage. A feedback amplifier is operated in accordance with the variations of the voltage on the regulated line from a predetermined reference, and, in turn, controls the input amplifier. The regulated direct voltage is employed as the operating voltage for the oscillator which, in one form of the invention, is a freely-running multivibrator that has the primary windings of the transformer connected as the reactive elements of the time-delay circuit thereof. Thereby, an alternating square-wave voltage is developed and supplied to the transformer.

The transformer primary windings, in one form of the invention, take the form of a center-tapped coil whose two windings have mutual inductance, whereby the voltage developed across each winding is substantially double (or some other multiple of) the regulated direct voltage. The doubled voltage is rectified and used as the direct-voltage supply for the feedback amplifier, whereby it is operated with a regulated voltage at a higher amplitude level than the unregulated D-C voltage, which ensures extremely good regulation of the D-C.

Means are also provided for employing the unregulated voltage as the supply for the feedback amplifier momentarily during initiation of circuit operation, until the oscillator is operating and the rectified doubled voltage is developed, and thereafter the unregulated voltage supply is decoupled from the feedback amplifier.

The foregoing and other objects of this invention, the various features thereof, as well as the invention itself may be more fully understood from the following description when read together with the accompanying drawing, in which:

The single figure is a schematic diagram of an embodiment of this invention.

In the drawing corresponding parts are referenced throughout by similar reference characters.

An unregulated direct voltage is supplied to input terminals 10 and 11, the latter of which is connected to a common terminal identified by the conventional ground symbol. Terminal 10 is connected to the collector 12 of a transistor 14 whose emitter 16 is connected to a line 18 at which a regulated direct voltage is developed. The voltage on the line 18 is sampled by means of a voltage divider 20 that includes the series resistors 22, 24 and 26. The resistor 24 is a variable one, and its tap is connected directly to the base 28 of a feedback transistor 30, whose collector is connected directly to the base of transistor 14 and whose emitter is connected via a Zener diode 32 to ground.

An oscillator and voltage-doubler circuit 34 includes two transistors 36 and 38, whose emitters are connected directly to ground and whose collectors are respectively cross-coupled via separate variable resistors 40 and 42 to the bases of the other transistors. The regulated voltage line 18 is connected to the center tap 44 of the primary 46 of a differential transformer 48, and via a decoupling capacitor 49 to ground. The other terminals of primary 46 are respectively connected to the collectors of transistors 36 and 38, which are respectively connected via clipping diodes 50 and 52 to ground, and via rectifying diodes 54 and 56 to a terminal 58. The latter terminal supplies the operating voltage for the collector of feedback transistor 30 via a load resistor 60. The unregulated voltage at the terminal 10 is also supplied via a switching diode 62, a load resistor 64 and resistor 60 as operating voltage for transistor 30.

The differential transformer 48 includes a movable core 66 which may be attached to an instrument such as a pressure transducer to be moved in opposite directions from a normal center position, as indicated by the arrow. The core movement varies the coupling between the primary 46 and two secondaries 68 and 70 which are symmetrically positioned on opposite sides of the center tap 44. Terminals of the secondaries 68 and 70 are connected together, and the other terminals thereof are connected via individual rectifiers 72 and 74 and individual filters 76 and 78, respectively. The filters are referenced to the common terminal of the secondaries. The outputs of the filters are connected to a pair of output terminals 80 and 81, the latter of which may be grounded. The line 18 is likewise connected to an output terminal 82 so that a regulated D-C voltage may be derived between the terminal 82 and a grounded terminal 83.

In one form of this invention, the terminals 80 and 82 are connected to a meter 84 which may be a ratio meter of any suitable type in which the direct voltage at terminal 82 provides a reference for the measured voltage at terminal 80. For example, where the meter is of the cross-coil type, the voltages are respectively applied to the two coils, and the measured voltage is thereby accurately referenced.

Any suitable source of unregulated direct voltage may be employed for supply to the terminals 10 and 11. For example, where an A-C line voltage is provided, a suitable circuit for conversion to D-C is shown in the drawing; the A-C source 86 is connected via a resistor 88 and rectifier diode 90 to terminal 10. A shunt capacitor 92, connected between terminal 10 and ground, provides filtering of the half-wave rectified voltage. A shunt resistor 94 and diode 96 are connected from the junction of resistor 88 and diode 94 to ground. The resistors 88 and 94 function as a voltage divider on the positive half-cycles of A-C and reduce the effect of line voltage variations especially as they would tend to increase power dissipation in transistor 14. Diode 94 blocks the negative half-cycles of A-C and any power dissipation due to them.

In operation, the unregulated voltage at terminal 10 is supplied to the collector of transistor 14, and its amplitude is reduced by the dissipation due to the impedance of the collector-emitter path thereof to produce a net voltage on the line 18. This voltage is applied across the voltage divider 20 and is sampled at the tap of resistor 24 to determine the base voltage of feedback transistor 30. The Zener diode 32 provides a reference voltage for the emitter of transistor 30, and the base-emitter voltage drop therein together with the Zener reference voltage determines the overall reference voltage with which the sampled voltage at the tap of resistor 24 is compared.

As the sampled voltage varies from the reference, the current drawn through load resistor 60 and dissipated in the collector-emitter path of transistor 30 also varies in the same direction. As this current varies, the base-emitter current in transistor 14 via resistor 60 also varies, but in the opposite direction. The latter current, in turn, determines the collector-emitter voltage dissipation in transistor 14. For example, if the voltage on line 18 tends to increase above the desired voltage level, the collector-emitter current in transistor 30 via load resistor 60 also increases, which decreases the base-emitter current in transistor 14, which in turn increases the voltage dissipation in the collector-emitter path of transistor 14 to reduce the voltage on line 18 to the desired level.

The oscillator 34 operates as a freely-running multivibrator in which the time base is determined by the inductance of each half of the primary winding and the resistance of the associated coupling resistors 40 or 42. The adjustment of resistors 40 and 42 determines the frequency of oscillation; these resistors are preferably ganged in order to provide symmetrical adjustment with the same period during each half-cycle of operation. The transistors 36 and 38 are operated in saturation as switches for square-wave generation, and alternately one or the other is conducting. Regenerative action for switching one transistor on and the other off is attained by the mutual inductance between the two halves of primary 46 and the cross-coupling to the base of the other transistor. The clipping diodes 50 and 52 operate to clip the overshoot or ringing of the primary winding 46; the negative-going back swing of voltage that would otherwise develop would tend to exceed the reverse-bias reading of the transistors and would also show up as spurious signals in the secondary windings 68 and 70. The capacitor 49 bypasses to ground those voltage spikes and transients from the unregulated source that are passed to the line 18 by the stray capacitance of transistor 14 and those transients produced at the center tap 44 due to stray capacitance and non-symmetry of transformer primary 48.

The mutual inductance between the two halves of the primary winding 46 serves to double the operating voltage applied to its center tap. That is, as one transistor 36 switches on and goes into saturation, its collector voltage falls substantially to ground potential, and the other transistor 38 is switched off and its collector rises toward the operating voltage and beyond that voltage, due to the voltage induced in its half of the primary as the transistor 36 conducts via the other half of the primary. The induced voltage is substantially equal to the operating voltage, so that the collector of transistor 38 is at substantially twice the operating voltage level with respect to ground. This doubled voltage is passed by rectifier 56 to terminal 58. On the other half-cycle, when transistor 38 is switched on, a doubled voltage is similarly developed at the collector of transistor 36, which is passed by rectifier 54 to terminal 58. The voltage at terminal 58 has substantially no ripple because of the square-wave output at the collector of each transistor. Thus, no filtering is required of the rectified voltage (if desired, half-wave rectification may be provided using but a single diode and a filter provided for smoothing the output). The voltage at terminal 58 is derived from the regulated voltage on line 18 and is thus likewise regulated, and it is also at a doubled amplitude. This voltage, supplied via load resistor 60, is employed as the operating voltage for feedback transistor 30.

When the circuit is initially turned on, the unregulated direct-voltage terminal 10 is supplied via diode 62 and load resistors 64 and 60 to the junction of the base of transistor 14 and the collector of transistor 30. This unregulated voltage is of sufficient amplitude to initiate operation of those transistors, which can function to develop an operating voltage for the oscillator 34. The latter then develops the doubled voltage at terminal 58, which is greater than the unregulated voltage amplitude. Consequently, diode 62 is back-biased and switched off, and the unregulated voltage source is decoupled from the feedback amplifier 30. If desired, the diode 62 may be replaced by a switch that is closed momentarily when the circuit is switched on and opens shortly thereafter when the voltage at terminal 58 has built up to an appropriate amplitude. Alternatively, the switching diode 62 may be eliminated and the resistor 64 used to connect terminal 10 directly to the collector of transistor 30. Thereby, the unregulated voltage is continuously supplied to transistor 30; however, it has but a minor effect compared to the multiplied voltage at terminal 58, since resistor 64 is very much larger than resistor 60 (e.g. 100:1) and the voltage contribution is proportionately smaller.

The regulation of voltage on line 18 is improved substantially, due to the fact that the operating voltage for feedback amplifier 30 is likewise regulated. This regulation is attained without an additional regulating circuit therefor and by means of the circuit 34 used to convert the D-C voltage to A-C. In addition, the operating voltage for feedback transistor 30 and for the base of transistor 14 is at a higher amplitude than the regulated D-C voltage, and this is attained without additional voltage transformers. Consequently, the unregulated D-C voltage at terminal 10 need not be very much greater than the regulated voltage amplitude at line 18, and the power dissipation in the collector-emitter path of transistor 14 is kept quite low, whereby relatively inexpensive transistors may be employed.

If a short should occur in the transformer windings, the oscillator 34 stops operating and the voltage applied to rectifiers 54 and 56 falls substantially to ground. Accordingly, the back bias of the switching diode 62 is released, and diode 62 conducts to supply the unregulated D-C as the operating voltage for transistor 30. Due to the transformer short, line 18 is essentially at ground, and transistor 30 is biased to cutoff. The value of resistor 64 is chosen to be quite large, so that the base-emitter bias current of transistor 14 is limited to be very low; thereby, the power dissipation in the collector-emitter path of transistor 14 is likewise kept very low notwithstanding the fact that the full unregulated voltage is applied across it. Thus, the transformer short is not reflected to the source of unregulated D-C voltage (nor to the A-C line 86) since the current drawn by transistor 14 is actually reduced. In the same fashion, if a short should develop at the regulated D-C line 18 (e.g. across terminals 82, 83) the operating voltage for the oscillator 34 is likewise lost, and the doubled voltage is no longer generated. Similarly, the current in transistor 14 is limited so that the ultimate voltage source (source 86) is effectively decoupled from the short.

The large value of resistor 64 ensures short protection without impairing circuit operation when it is turned on. That is, in the absence of a short, the small voltage (e.g. less than a volt) initially developed at line 18 (due to the small current via diode 62 and resistor 64) is sufficient to start oscillator operation, and, in turn, develop a doubled voltage at terminal 58. This doubled voltage increases the bias current in transistor 14 to increase the voltage on line 18. This action continues regeneratively, and the voltage on line 18 builds up until it attains the regulated voltage level. At that time, transistor 30 starts to operate to maintain the regulation.

The core 66 of the differential transformer 48 may be connected in various types of measuring systems; for example, it may be connected to a pressure diaphragm or bellows to be movable therewith. As the core 66 is displaced from its central position, where it provides equal coupling to the secondary windings 68 and 70, the coupling to one is increased while the coupling to the other is decreased. Correspondingly, the voltages in the two windings are increased and decreased, respectively. These induced voltages are rectified and filtered, and the voltages at terminals 80 and 81 provide a net difference voltage. In applying the voltage at terminal 80 to a meter, the regulated voltage at terminal 82 is also applied thereto to provide a reference for the measured voltage. Thus, with any small variations in the regulated direct voltage, that would produce corresponding variations in the measured voltage at terminal 80, these variations are effectively cancelled out in the operation of meter 84.

If desired, the operating voltage developed at terminal 58 may be any desired multiple of the operating voltage; the multiple factor is determined by the turns ratio of the conducting section of the primary winding to the non-conducting section thereof. Accordingly, by connecting the anodes of rectifiers 54 and 56 to terminals of the primary winding 46 incorporating a greater number of turns than the terminals to which the collectors of transistors 36 and 38 are connected, multiples of the operating voltage greater than two are generated.

In the specific embodiment of this invention illustrated in the drawing, the inductance of primary winding 46 is employed, both for the oscillator circuit generating the alternating square-wave voltage and for the voltage-multiplying operation. If a transformer is not required for utilization of the A-C voltage that is generated, a center-tapped inductor similar to primary winding 46 may be employed, and the A-C voltage may be derived from appropriate taps thereon directly. Furthermore, if desired, a capacitive cross-coupling may be provided in the multivibrator in place of the inductor 46; suitable capacitive cross-coupling multivibrators are well known in the art. The voltage multiplier may also be provided by a capacitor doubler circuit as is well known in the art, or by any other suitable voltage step-up circuit. If a sine-wave A-C voltage is required, any suitable form of sine-wave oscillator may be employed instead of the square-wave multivibrator described above; however, in such a case, filtering would be required for the rectified doubled voltage derived therefrom.

Accordingly, a new and improved regulated voltage supply is provided by this invention, which ensures regulation of both direct and alternating voltages. The conversion of the direct to alternating voltage is itself used to improve the regulation of the direct voltage. This invention is especially adapted for use in a measuring system employing a variable differential transformer.

Suitable component types and values for the regulating circuit illustrated in the drawing are as follows: Transistor 2N2102; diodes 1N459; Zener diode 1N764-4; resistor 22, 2210 ohms; resistor 24, 1K; resistor 26, 1820 ohms; resistors 40 and 42, 20K; resistor 60, 4990 ohms; resistor 64, 499K; capacitor 49, 5 microfarads; primary coil 46, 1 millihenry; in the input circuit for 115 v., A-C±10%: diodes 1N3194; resistor 88, 600 ohms; resistor 94, 1.5 K; capacitor 92, 250 microfarads. With these values, the unregulated D-C voltage at terminal 10 may vary from about 23–33 volts; the adjustment of resistor 24 may vary the regulated D-C on line 18 between about 17 to 21.5 volts. Thus, with a regulated voltage selected for 21.5 volts, the unregulated D-C may be as low as 23 volts; this low dissipation across transistor 14 is attained by means of this invention.

A preferred form of this invention is shown and described by way of illustration; it is apparent that various modifications of the invention will occur to those skilled in the art (e.g. various other forms of solid state or electron tube amplifiers may be used). It is contemplated, therefore, that the claims which conclude the specification will cover all such modifications as fall within the true spirit of this invention.

What is claimed is:
1. The combination of a regulated power supply circuit and a measuring system;
said measuring system comprising a differential transformer having mutually coupled primary windings;
and said power supply comprising:
a regulated direct-current supply circuit including a first amplifier circuit for developing a regulated direct voltage from an unregulated direct voltage, and a second amplifier circuit responsive to said regulated direct voltage for controlling the operation of said first amplifier circuit;
a voltage-multiplier circuit including an oscillator circuit, means for coupling said primary windings as reactive elements of said oscillator circuit, and means for rectifying multiplied voltages developed across at least one of said primary windings;
means coupling said first amplifier circuit to said oscillator circuit to supply said regulated voltage as the operating voltage therefor;
and means coupling said rectifying means to said second amplifier circuit to supply the rectified multiplied voltage as the operating voltage therefor.

2. The combination as set forth in claim 1 wherein:
said power supply circuit further comprises switching means for alternatively supplying said unregulated voltage to said second amplifier circuit as operating voltage therefor.

3. The combination as set forth in claim 1 wherein:
said transformer further comprises a plurality of secondary windings and a movable core for varying the relative coupling between said primary windings and said secondary windings in accordance with a displacement to be measured;
and said measuring system further comprises:
means for developing a direct voltage varying in accordance with the combined voltages in said secondary windings;
a meter;
and means for applying to said meter said developed direct voltage and said regulated direct voltage as a reference therefor.

4. A regulated power supply circuit comprising:
a regulated direct-current supply circuit including a first amplifier circuit for developing a regulated direct voltage from an unregulated direct voltage, and a second amplifier circuit responsive to said regulated direct voltage for controlling the operation of said first amplifier circuit;
a voltage-step-up circuit including an oscillator circuit for generating alternating rectangular voltages, and means for deriving direct stepped-up voltages from said alternating voltages, wherein said oscillator circuit includes a freely running multivibrator for generating said rectangular voltages;
means coupling said first amplifier circuit to said oscillator circuit to supply said regulated voltage as the operating voltage therefor;
and means coupling said deriving means to said second amplifier circuit to supply the direct stepped-up voltage as the operating voltage therefor.

5. A regulated power supply circuit as recited in claim 4, and further comprising switching means for alternatively supplying said unregulated voltage to said second amplifier circuit as operating voltage therefor, said switching means including means responsive to the amplitude of said direct stepped-up voltage for blocking the supply of said unregulated voltage to said second amplifier circuit.

6. A regulated power supply circuit as recited in claim 4, wherein said multivibrator includes a plurality of mutually coupled windings as reactive elements thereof, and a plurality of cross-coupled amplifier devices respectively associated with said windings;

and said stepped-up voltage deriving means includes means for deriving multiplied voltages from at least one of said windings, and means for rectifying the multiplied voltages.

7. A regulated power circuit for supplying alternating current to a differential transformer having mutually coupled primary windings, said circuit comprising:

a regulated direct-current supply circuit including a first amplifier circuit for developing a regulated direct voltage from an unregulated direct voltage, and a second amplifier circuit responsive to said regulated direct voltage for controlling the operation of said first amplifier;

a voltage-multiplier circuit including an oscillator circuit for generating alternating rectangular-wave voltages, means for coupling said primary windings as reactive elements of said oscillator circuit, and means for rectifying multiplied voltages developed across at least one of said primary windings;

means coupling said first amplifier circuit to said oscillator circuit to supply said regulated voltage as the operating voltage therefor;

means coupling said rectifying means to said second amplifier circuit to supply the rectified multiplied voltage as the operating voltage therefor;

and switching means for supplying said unregulated voltage to said second amplifier circuit as the operating voltage therefor.

References Cited

UNITED STATES PATENTS

| 2,487,523 | 11/1949 | Coake | 340—199 |
|---|---|---|---|
| 2,648,058 | 8/1953 | Breedlove | 340—199 |
| 2,720,622 | 10/1955 | Devser | 331—186 X |
| 3,204,175 | 8/1965 | Kuriger | 323—22 |

JOHN W. CALDWELL, Primary Examiner

CHARLES M. MARMELSTEIN, Assistant Examiner

U.S. Cl. X.R.

323—22